(No Model.)

R. MANNESMANN.
CARRIAGE AXLE.

No. 551,291. Patented Dec. 10, 1895.

Witnesses.
Robert Ewatt,
A. H. Norris

Inventor:
Reinhard Mannesmann.
By James L. Norris.
Atty.

UNITED STATES PATENT OFFICE.

REINHARD MANNESMANN, OF REMSCHEID, GERMANY, ASSIGNOR TO THE MANNESMANN TUBE COMPANY, OF JERSEY CITY, NEW JERSEY.

CARRIAGE-AXLE.

SPECIFICATION forming part of Letters Patent No. 551,291, dated December 10, 1895.

Application filed March 6, 1895. Serial No. 540,769. (No model.)

*To all whom it may concern:*

Be it known that I, REINHARD MANNESMANN, of Remscheid, Germany, a subject of the Emperor of Germany, now residing at New York, in the county of New York and State of New York, have invented new and useful Improvements in Carriage-Axles, of which the following is a specification.

This invention relates to tubular axles for the wheels of carriages, and has for its chief object to provide a new and improved axle particularly designed for the carriage of a howitzer, but useful for any vehicle having wheels which rotate on axle-spindles.

The invention also has for its object to provide tubular carriage-axles by making them seamless and weldless, and strongest at the junctions of cylindrical wheel-spindles with the angular body, at which points the greatest danger of breakage resides.

The invention also has for its object to provide a tubular carriage-axle having cylindrical wheel-spindles, and a body substantially square in cross-section with the shell so constructed as to obtain the characteristics of elasticity and the greatest possible strength with the least quantity of metal, and a consequent diminished weight of the structure, whereby a tubular axle can be made lighter in weight and have a shell which is comparatively thin, while it is susceptible of successfully withstanding pressures, strains, and abnormal stresses greatly exceeding the power of resistance of ordinary tubular axles composed of parts welded together as heretofore proposed.

To accomplish all these objects my invention consists in the axle hereinafter described and pointed out in the claims, reference being made to the accompanying drawings, in which—

Figure 1:
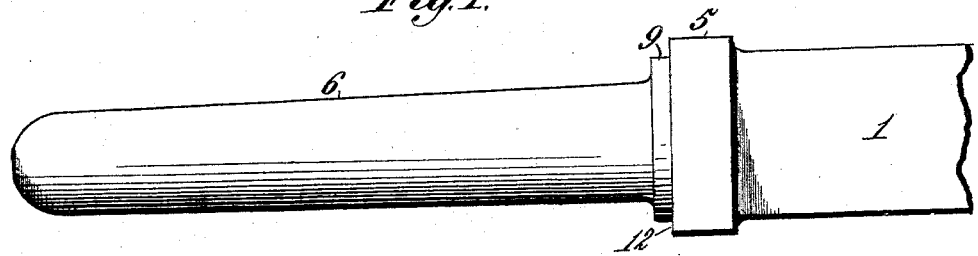
Figure 2:
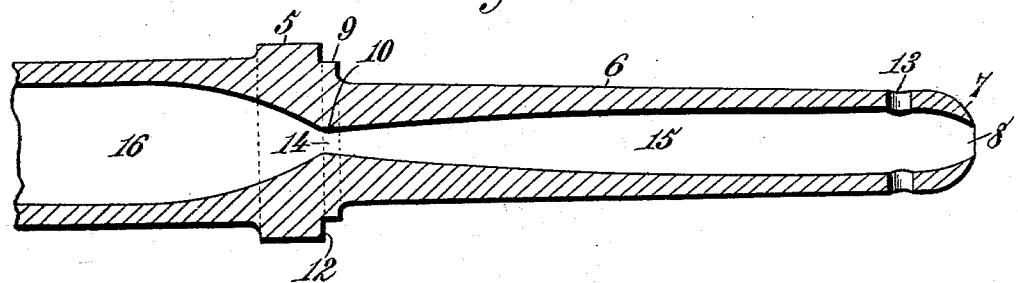
Figure 3:
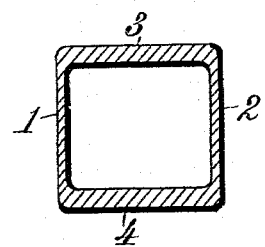

Figure 1 is a side elevation of one end portion of an axle embodying my invention. Fig. 2 is a longitudinal sectional view of the opposite end portion of the axle; and Fig. 3 is a transverse sectional view, taken through the axle-body at a point between the axle-collars.

A tubular wheel-axle composed of two sections, seamed longitudinally by welding them together, is very liable to crack at the seams if subjected to undue strains, and, as ordinarily constructed, the spindles of the tubular axles are extremely liable to break at the junctions of the wheel-spindles with the axle-body. If the quantity of metal necessary to secure the requisite strength to withstand excessive strains be employed, the axle is objectionable, in that it is too heavy in weight and too rigid or inelastic to successfully withstand the sudden jars or shocks to which vehicles, particularly gun-carriages, are frequently subjected.

To avoid the objections stated I construct the axle of a seamless, weldless, elastic tube of steel, or other metal suitable for the purpose in hand, which construction is feasible, by producing the tubular structure in the form, hereinafter explained, according to the well-known Mannesmann method or process of rolling tubes. I do not, however, confine myself to any particular method or process of manufacturing or producing the improved axle. The axle-body here shown is substantially square in cross-section, and its vertical side walls 1 and 2 are thinner than its horizontal top and bottom walls 3 and 4, whereby the top and bottom walls contain the quantity of metal necessary to secure great strength, while the relatively thin side walls secure elasticity and enable the axle-body to sustain enormous strains transmitted vertically.

The end portions of the axle-body are formed integral with collars 5, which are preferably circular, and from each collar, and integral therewith, extends a cylindrical wheel-spindle 6, which is hollow or tubular, and is provided with a hemispheroidal outer end portion 7, open at its center, as at 8. The collar and spindle at each end of the angular or square axle-body are integral with a secondary collar 9, adapted to fit into a circular seat provided in the inner end of a wheel-hub. The end portions of the shell of the axle-body, composed of walls 1, 2, 3, and 4, before explained, gradually increase in thickness outwardly, and the diameter of the chamber in the axle-body gradually decreases in diameter through each collar portion 5 to the point 10, which is coincident with the outer vertical face 12 of the axle-collar 5. From the point 10 the shell of each cylindrical wheel-spindle gradually and uniformly diminishes in thickness to the edge of the opening 8 in the center of the hemispheroidal end 7. The chamber in each spindle increases in diameter from the point 10 to a linchpin-hole 13, near the outer end of the spindle, and from thence the diameter of the chamber slightly diminishes in diameter. The communicating passage 14, between the chamber 15 in each wheel-spindle and the chamber 16 in the axle-body, is contracted and of relatively small diameter, so that an increased body of metal is provided at each junction of a spindle with the axle-collar and axle-body.

By the means described and shown great strength is secured at the points where the greatest danger of breakage resides, and a tubular axle is provided which is superior to anything of the kind of which I am aware.

The axle-body, the axle-collars, and the wheel-spindles are all integral and entirely minus seams and welds, and therefore all liability of cracking along a seam is entirely avoided.

The metal is elastic to a high degree, which is rendered possible by producing it in the form of a seamless, elastic tube of steel, or other suitable metal, by the Mannesmann method or process of cross-rolling.

The increased body of metal between the axle-body and each wheel-spindle is exactly coincident with the outer vertical face 12 of the axle-collar 5, which point is the one most liable to break in the event of the vehicle being subjected to sudden jars, shocks, or strains, or abnormal stresses.

The square form in cross-section of the axle-body enables it to be properly secured by clips to the bolster, or other part of a gun-carriage, or other vehicle.

Having thus described my invention, what I claim is—

1. A carriage-axle, consisting of a seamless, elastic tube of steel, or other metal, having an axle-body, square in cross section, with thick top and bottom walls and relatively thin side walls, and wheel-spindles the shells of which increase in thickness from a point at or near their outer ends to their junction with the axle-body to produce the requisite quantity of metal at the points where the greatest danger of breakage resides.

2. A carriage-axle, consisting of a seamless, elastic tube of steel, or other metal, comprising an axle-body square in cross section, and having thick top and bottom walls and relatively thin side walls, an axle-collar and a cylindrical wheel-spindle, said axle-body and said wheel-spindle having their shells increasing in thickness to a point coincident with the outer vertical face of the axle-collar to secure an increased quantity of metal at the point where the greatest danger of breakage resides.

3. A rolled, seamless carriage axle, formed integral with cylindrical wheel-spindles and a square-axle-body, the upper and lower walls of which increase in thickness longitudinally and laterally relatively to thin side walls, and having the shells of the wheel-spindle gradually increased in thickness from their outer extremities to their junctions with the thickened outer end portions of the square axle-body.

In testimony whereof I have hereunto set my hand in presence of two subscribing witnesses.

REINHARD MANNESMANN.

Witnesses:
EMIL KIPPER,
ALBERT H. NORRIS.